(12) United States Patent
Cao (10) Patent No.: US 11,070,705 B2
(45) Date of Patent: Jul. 20, 2021

(54) SYSTEM AND METHOD FOR IMAGE DYNAMIC RANGE ADJUSTING

(71) Applicant: SZ DJI TECHNOLOGY CO., LTD., Shenzhen (CN)

(72) Inventor: Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/697,997

(22) Filed: Nov. 27, 2019

(65) Prior Publication Data

US 2020/0099823 A1 Mar. 26, 2020

Related U.S. Application Data

(63) Continuation of application No. PCT/CN2017/110154, filed on Nov. 9, 2017.

(51) Int. Cl.
*H04N 1/60* (2006.01)
*G06T 5/00* (2006.01)

(52) U.S. Cl.
CPC ........... *H04N 1/6027* (2013.01); *G06T 5/009* (2013.01); *H04N 1/6072* (2013.01); *G06T 2207/10024* (2013.01)

(58) Field of Classification Search
CPC .... H04N 1/6027; H04N 1/6072; G06T 5/009; G06T 2207/10024
See application file for complete search history.

(56) References Cited

U.S. PATENT DOCUMENTS 7,433,514 B2 10/2008 Sloan
8,831,340 B2 9/2014 Paris et al.
9,275,445 B2 3/2016 Granados et al.
(Continued)

FOREIGN PATENT DOCUMENTS

| CN | 104463820 A | 3/2015 |
| CN | 105825472 A | 8/2016 |
| CN | 105894456 A | 8/2016 |
| WO | 2014066364 A1 | 5/2014 |
| WO | 2017091278 A1 | 6/2017 |

OTHER PUBLICATIONS

The World Intellectual Property Organization (WIPO) International Search Report and Written Opinion for PCT/CN2017/110154 dated Jul. 26, 2018 7 pages.
(Continued)

*Primary Examiner* — Christopher Wait
(74) *Attorney, Agent, or Firm* — Anova Law Group, PLLC (57) ABSTRACT

A method includes obtaining a dynamic range representation of an image including multiple color channels. The dynamic range representation includes dynamic range information of pixels of the image in the color channels. The method further includes decomposing the dynamic range representation into a smooth portion, a color portion, and a detail portion. The smooth portion includes low frequency information of the pixels in the color channels. The color portion includes color intensity information of the pixels in the color channels. The detail portion includes high frequency information of the pixels in the color channels. The method also includes adjusting the smooth portion, the color portion, and the detail portion, respectively, to obtain an adjusted smooth portion, an adjusted color portion, and an adjusted detail portion, and combining the adjusted smooth portion, the adjusted color portion, and the adjusted detail portion to generate an output image.

18 Claims, 4 Drawing Sheets

(56) References Cited

U.S. PATENT DOCUMENTS

| | | | |
|---|---|---|---|
| 9,299,317 B2 | 3/2016 | Ward | |
| 2011/0026815 A1* | 2/2011 | Han | G06T 5/008 382/164 |
| 2014/0118585 A1 | 5/2014 | Naccari et al. | |
| 2014/0152686 A1 | 6/2014 | Narasimha et al. | |

OTHER PUBLICATIONS

Qi Shan, et al., Globally Optimized Linear Windowed Tone Mapping, IEEE Transactions on Visualization and Computer Graphics, Jul./Aug. 2010, vol. 16, No. 4, pp. 663-675.

Fredo Durand and Julie Dorsey, Fast Bilateral Filtering for the Display of High-Dynamic-Range Images, In ACM Transactions on Graphics, 2002, vol. 21, pp. 257-266.

Raanan Fattal, et al., Gradient Domain High Dynamic Range Compression, In ACM Transactions on Graphics, 2002, vol. 21, pp. 249-256.

Min H. Kim and Jan Kautz, Consistent Tone Reproduction, 2008.

Bo Gu, et al., Local Edge-Preserving Multiscale Decomposition for High Dynamic Range Image Tone Mapping. IEEE Transactions on Image Processing, Jan. 2013, vol. 22, No. 1, 70-79.

Zeev Farbman, et al., Edge-Preserving Decompositions for Multi-Scale Tone and Detail Manipulation. In ACM Transactions on Graphics, 2008, vol. 27, p. 67.

Kaiming He, et al., Guided Image Filtering, Computer Vision ECCV 2010, 11th European Conference on Computer Vision, Sep. 2010, Springer Berlin Heidelberg, pp. 1-14.

Li Xu, et al., Image Smoothing via L0 Gradient Minimization, ACM Transactions on Graphics, Dec. 2011, vol. 30, No. 6.

* cited by examiner

SYSTEM AND METHOD FOR IMAGE DYNAMIC RANGE ADJUSTING

CROSS-REFERENCE TO RELATED APPLICATION

This application is a continuation of International Application No. PCT/CN2017/110154, filed Nov. 9, 2017, the entire content of which is incorporated herein by reference.

TECHNICAL FIELD

The present disclosure generally relates to image processing technique and, more particularly, to methods, systems, and media for adjusting image dynamic range.

BACKGROUND

In general, each display device has a limited dynamic range for displaying an image. When an original image having a high dynamic range is displayed by such a display device, the displayed image may appear too dark or too light, and may be missing a lot of important details of the original image. In view of the problem that the dynamic range of the display device and the image does not match to each other, the dynamic range of an image having a high dynamic range image can be adjusted. Specifically, the value of each pixel of the image can be compressed to narrow the entire dynamic range of the image, so that the image can be effectively displayed on a general display device.

However, in a process of decomposing a color image, the existing methods for adjusting image dynamic range only consider the structure and content information of the color image, and do not take the color information of the color image into account. Although the existing methods for image dynamic range compression may have a subsequent color repair process, such as tone mapping, to recover the color information, the displayed image may still have problems in the image colors, such as a color offset.

SUMMARY

An aspect of the present disclosure provides a method for adjusting image dynamic range, comprising: obtaining a dynamic range representation of an image including a plurality of color channels, the dynamic range representation including dynamic range information of pixels of the image in the color channels; decomposing, by a hardware processor, the dynamic range representation into a smooth portion, a color portion, and a detail portion, the smooth portion including low frequency information of the pixels in the color channels, the color portion including color intensity information of the pixels in the color channels, and the detail portion including high frequency information of the pixels in the color channels; adjusting the smooth portion, the color portion, and the detail portion, respectively, to obtain an adjusted smooth portion, an adjusted color portion, and an adjusted detail portion; and combining the adjusted smooth portion, the adjusted color portion, and the adjusted detail portion to generate an output image.

Another aspect of the present disclosure provides a system for adjusting image dynamic range, the system comprising: a hardware processor; and a memory storing instructions that, when executed by the hardware processor, cause the hardware processor to: obtain a dynamic range representation of an image including a plurality of color channels, the dynamic range representation including dynamic range information of pixels of the image in the color channels; decompose the dynamic range representation into a smooth portion, a color portion, and a detail portion, the smooth portion including low frequency information of the pixels in the color channels, the color portion including color intensity information of the pixels in the color channels, and the detail portion including high frequency information of the pixels in the color channels; adjust the smooth portion, the color portion, and the detail portion, respectively, to obtain an adjusted smooth portion, an adjusted color portion, and an adjusted detail portion; and combine the adjusted smooth portion, the adjusted color portion, and the adjusted detail portion to generate an output image.

Another aspect of the present disclosure provides a non-transitory computer-readable medium containing computer-executable instructions that, when executed by a hardware processor, cause the hardware processor to perform a method for adjusting image dynamic range, the method comprising: obtaining a dynamic range representation of an image including a plurality of color channels, the dynamic range representation including dynamic range information of pixels of the image in the color channels; decomposing, by a hardware processor, the dynamic range representation into a smooth portion, a color portion, and a detail portion, the smooth portion including low frequency information of the pixels in the color channels, the color portion including color intensity information of the pixels in the color channels, and the detail portion including high frequency information of the pixels in the color channels; adjusting the smooth portion, the color portion, and the detail portion, respectively, to obtain an adjusted smooth portion, an adjusted color portion, and an adjusted detail portion; and combining the adjusted smooth portion, the adjusted color portion, and the adjusted detail portion to generate an output image.

BRIEF DESCRIPTION OF THE DRAWINGS

Various objects, features, and advantages of the disclosure can be more fully appreciated with reference to the following detailed description of embodiments when considered in connection with the drawings, in which like reference numerals identify like elements unless otherwise specified. It should be noted that the drawings are merely examples for illustrative purposes according to various disclosed embodiments and are not intended to limit the scope of the present disclosure.

DETAILED DESCRIPTION

Exemplary embodiments of the disclosure will be described in more detail below with reference to the drawings. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

In accordance with various embodiments, the present disclosure provides methods, systems, and media for adjusting image dynamic range. The disclosed method, systems, and media use a generalized Retinex color image decomposition model, which embeds color information in an image decomposition model. As such, an output image may not be distorted after the image dynamic range decomposition process.

Figure 1:
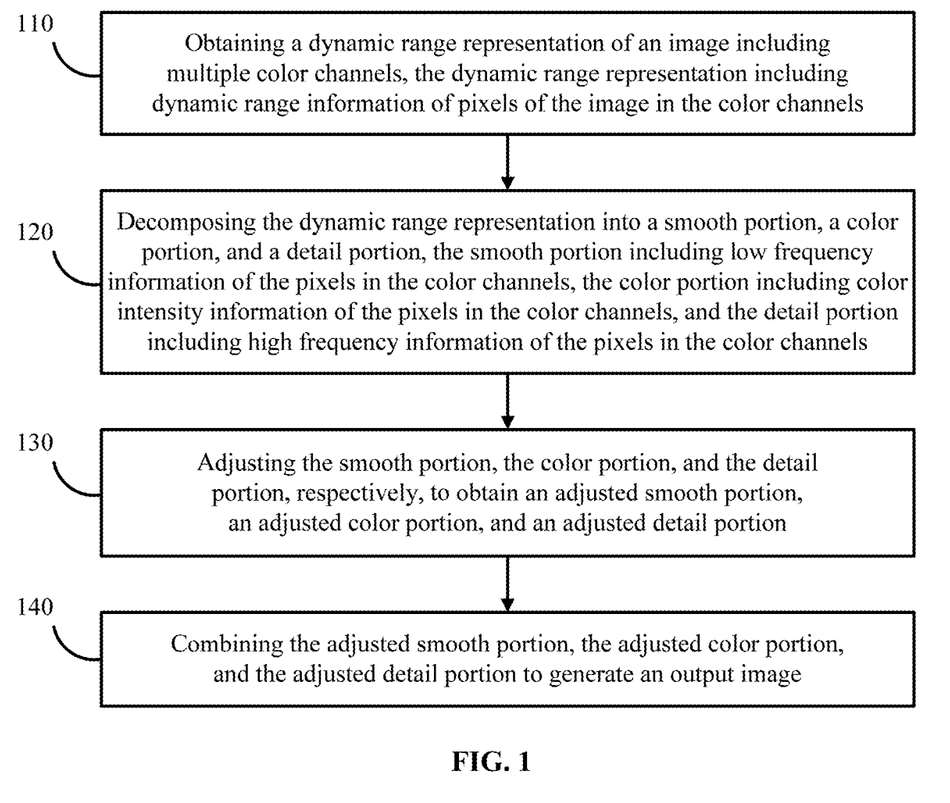
FIG. 1 illustrates a flow diagram of an exemplary process for adjusting image dynamic range in accordance with some embodiments of the disclosure.

FIG. 1 illustrates a flow diagram of an exemplary process for adjusting image dynamic range in accordance with some embodiments of the disclosure.

As shown, at 110, a dynamic range representation of an image is obtained. The image, as used in this disclosure, can refer to an entire picture taken by an imaging device, or can include a portion of the picture taken by the imaging device. Further, the image can be a high dynamic image. That is, the image can be a digital image having a high dynamic range (HDR). For example, the image can be obtained by a high-dynamic-range imaging or photography device. In some embodiments, the image can be a color image, and the dynamic range representation may include dynamic range information of pixels of the image in multiple color channels.

The dynamic range representation of the image can include one of various forms, such as a dynamic range array (or matrix). For example, FIG. 2 illustrates a flow diagram of an exemplary process for obtaining the dynamic range array of the image as the dynamic range representation.

As used in this disclosure, unless otherwise specified, an array may have dimensions that correspond to the rows and columns of pixels in the image. That is, the number of rows and the number of columns are the same as the number of rows of pixels and the number of columns of pixels in the image, respectively, and each element of the array corresponds to one of the pixels in the image. Further, an element of the array can include a vector or a scaler. The vector can have a dimension that is the same as a number of the color channels of the image. That is, each element of the vector corresponds to one of the color channels.

Figure 2:
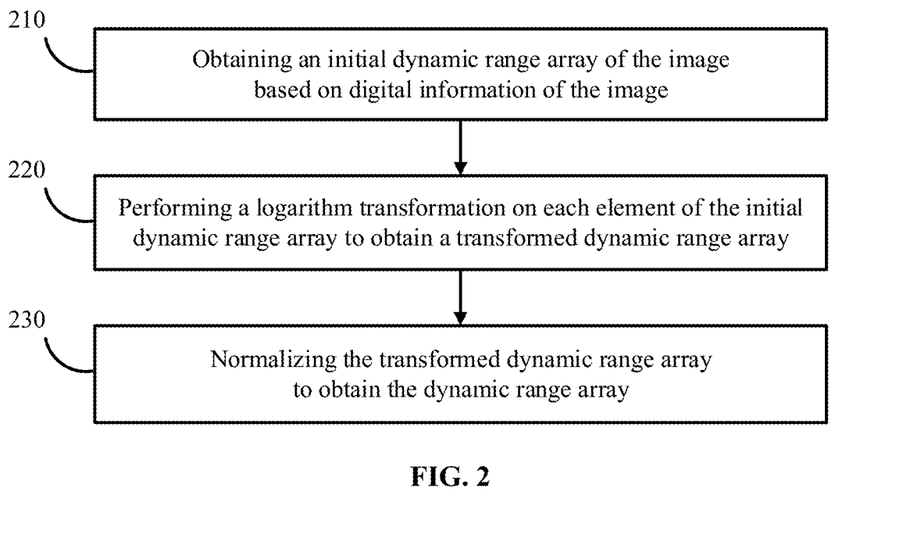
FIG. 2 illustrates a flow diagram of an exemplary process for obtaining a dynamic range representation of an image in accordance with some embodiments of the disclosure.

As shown in FIG. 2, at 210, an initial dynamic range array of the image is obtained based on digital information of the image. The initial dynamic range array (or matrix), which can be denoted as I, can include original digital information of pixels of the image, with each element of the initial dynamic range array I including the original digital information of one of the pixels. The original digital information of a pixel can include, for example, an initial dynamic range vector v associated with the pixel.

For example, for an image having n rows and m columns of pixels, each of which can be represented by a pair of horizontal coordinate and vertical coordinate $(x_i, y_j)$ with $1 \leq i \leq n$ and $1 \leq j \leq m$, the initial dynamic range array (or matrix) I can include an n×m array, and each element of the initial dynamic range array I, i.e., can correspond to one pixel $(x_i, y_j)$ of the image and can include an initial dynamic range vector for the corresponding pixel $(x_i, y_j)$. The initial dynamic range vector corresponding to the pixel $(x_i, y_j)$ can also be denoted as $v(x_i, y_j)$. That is, the initial dynamic range array I can have a form as follows:

$$\begin{bmatrix} v(x_1, y_1) & \cdots & v(x_1, y_m) \\ \vdots & \ddots & \vdots \\ v(x_n, y_1) & \cdots & v(x_n, y_m) \end{bmatrix}.$$

Each element of the initial dynamic range array I, i.e., the initial dynamic range vector $v(x_i, y_j)$, can include, for example, color information and brightness information of the corresponding pixel.

In some embodiments, each of the initial dynamic range vectors v can have a dimension that is the same as a number of the color channels. For example, the image can have an RGB color format, and can include three color channels corresponding to the red color, the green color, and the blue color, respectively. In this example, each initial dynamic range vector v can be a three-dimensional vector $[v_1, v_2, v_3]$. For example, the initial dynamic range vector $v(x_i, y_j)$ for a pixel $(x_i, y_j)$ can be $[v_1(x_i, y_j), v_2(x_i, y_j), v_3(x_i, y_j)]$. As another example, the image can have a CMYK color format, and can include four color channels corresponding to the cyan color, the magenta color, the yellow color, and the black color, respectively. In this example, each initial dynamic range vector v can be a four-dimensional vector $[v_1, v_2, v_3, v_4]$. Each element of the initial dynamic range vector $v(x_i, y_j)$ can include, for example, color intensity information of the corresponding color channel of the pixel $(x_i, y_j)$.

At 220, a logarithm transformation is performed on each element of the initial dynamic range array to obtain a transformed dynamic range array. For example, a logarithm transformation is performed on each element of the initial dynamic range array I to obtain the transformed dynamic range array.

At 230, the transformed dynamic range array is normalized to obtain the dynamic range array. For example, the transformed dynamic range array can be normalized to obtain the dynamic range array $\mathcal{J}$. In some embodiments, the normalization can be implemented by dividing the transformed dynamic range array by a maximum value of the transformed dynamic range array, i.e., by the largest one of the elements of the transformed dynamic range array. As such, values of the elements of the obtained dynamic range array can be within a range between 0 and 1.

Similar to the initial dynamic range array I, each element of the dynamic range array $\mathcal{J}$, i.e., $\mathcal{J}(x_i, y_j)$, can correspond to one pixel $(x_i, y_j)$ of the image and can include a dynamic range vector for the corresponding pixel $(x_i, y_j)$. The dynamic range vector corresponding to the pixel $(x_i, y_j)$ can also be denoted as $v(x_i, y_j)$. Further, similar to the initial dynamic range vector v, the dynamic range vector v also has a dimension that is the same as the number of channels in the image. For example, the dynamic range vector v can be $[v_1, v_2, v_3]$ for an image having three color channels or $[v_1, v_2, v_3, v_4]$ for an image having four color channels The process for obtaining the dynamic range representation of the image shown in FIG. 2 is only an example. Note that, any other suitable dynamic range representation of the image can be obtained for indicating the dynamic range information of pixels of the image in multiple color channels.

Referring again to FIG. 1, at 120, the dynamic range representation is decomposed into a smooth portion, a color portion, and a detail portion. In some embodiments, the smooth portion can include low frequency information of the pixels in the color channels, the color portion can include color intensity information of the pixels in the color channels, and the detail portion can include high frequency information of the pixels in the color channels.

In some embodiments, as described above, the dynamic range representation can include the dynamic range array $\mathcal{J}$. In these embodiments, the smooth portion can include a low frequency information array, the color portion can include a color intensity information array, and the detail portion can include a high frequency information array. Each of the low frequency information array, the color intensity information array, and the high frequency information array has dimensions that are same as the dimensions of the dynamic range array. Each element of the low frequency information array can include a low frequency feature vector for one of the pixels, each element of the color intensity information array can include a color intensity feature vector for one of the pixels, and each element of the high frequency information array can include a high frequency feature vector for one of the pixels. Similarly, the low frequency feature vectors, the color intensity feature vectors, and the high frequency feature vectors each have a dimension that is the same as the number of the color channels.

Figure 3:
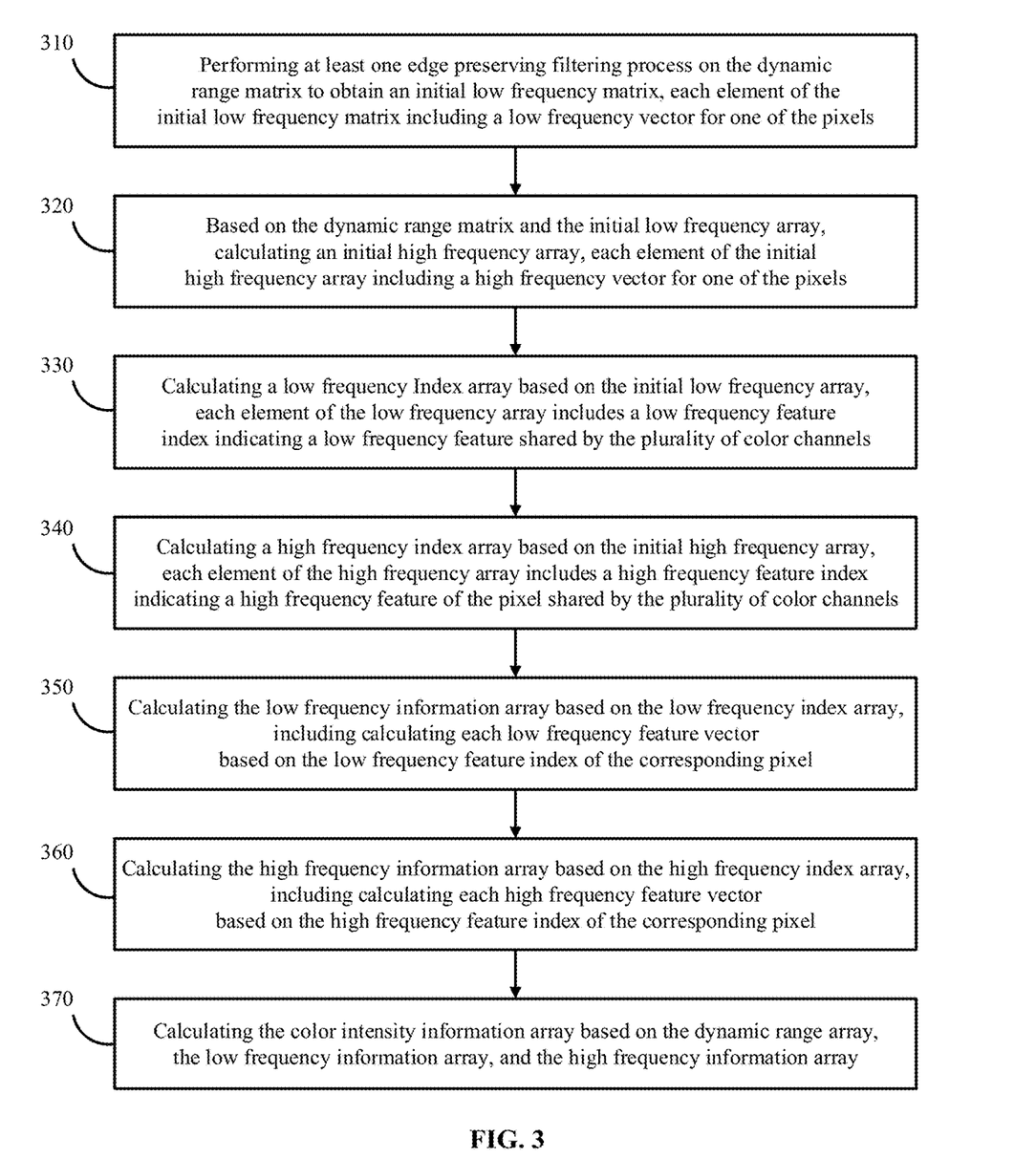
FIG. 3 illustrates a flow diagram of an exemplary process for decomposing a dynamic range representation in accordance with some embodiments of the disclosure.

FIG. 3 illustrates a flow diagram of an exemplary process for decomposing the dynamic range representation into the smooth portion, the color portion, and the detail portion in the situation where the dynamic range representation includes the dynamic range array.

As shown in FIG. 3, at 310, at least one edge preserving filtering process is performed on the dynamic range array to obtain an initial low frequency array. In some embodiments, each element of the initial low frequency array can include a low frequency vector for one of the pixels.

In some embodiments, the edge preserving filtering process can be performed on the dynamic range array (or matrix) $\mathcal{J}$ to obtain the initial low frequency array (or matrix): $X^*=\Phi(\mathcal{J})$. $\Phi(.)$ is an edge preserving filtering operator and can be applied separately to each color channel of the image, $X^*$ is the initial low frequency array.

In some embodiments, the edge preserving filtering operator $\Phi(.)$ can correspond to any suitable edge preserving filtering method. For example, the edge preserving filtering operator $\Phi(.)$ can correspond to a globally-optimized edge preserving filtering method, such as an L0 smoothing method, an edge preserving decomposition method, or a total variation method. As another example, the edge preserving filtering operator $\Phi(.)$ can correspond to a local-block-based edge preserving filtering method, such as a guided filtering method, a local edge preserving decomposition method, or a bilateral filtering method. In the following description, a guided filtering method is used as an example but other filtering methods can also be used.

Further, in order to obtain multiscale information of the image, a multiscale edge preserving filtering process can be performed on the dynamic range array to obtain the initial low frequency array. That is, for obtaining image features at multiple scales of resolution of the image, multiple edge preserving filtering processes can be performed on the same image at different resolutions, e.g., using image blocks of different sizes.

The initial low frequency array can be obtained based on the results of the multiple edge preserving filtering processes. For example, a first edge preserving filtering process can be performed on the dynamic range array to obtain a first scale low frequency array and a first scale detail portion. Thereafter, the first scale low frequency array can be further decomposed by a second edge preserving filtering process to obtain a second scale low frequency array and a second scale detail portion. The edge preserving filtering process can be performed multiple times, e.g., N times, successively to obtain an Nth scale low frequency array, which is the initial low frequency array. The generated scale detail portions after the multiple edge preserving filtering processes are also referred to as multi-scale detail portions.

For example, in one of the multiple edge preserving filtering processes, the image can be divided into a first set of square image blocks having a five-pixel length and a five-pixel width (i.e., 5×5), and a first edge preserving filtering operator such as a guided filter can be applied to the image including the first set of square image blocks. In another one of the multiple edge preserving filtering processes, the image can be divided into a second set of square image blocks having a fifty-pixel length and a fifty-pixel width (i.e., 50×50), and a second edge preserving filtering operator such as a guided filter can be applied to the image including the second set of square image blocks.

At 320, an initial high frequency array is calculated based on the dynamic range array and the initial low frequency array. For example, the initial high frequency array can be calculated by subtracting the initial low frequency array $X^*$ from the dynamic range array $\mathcal{J}$: ($\mathcal{J}-X^*$). In some embodiments, each element of the initial high frequency array ($\mathcal{J}-X^*$) can include a high frequency vector for one of the pixels.

At 330, a low frequency index array is calculated based on the initial low frequency array. In the present disclosure, symbol $\mathcal{L}$ is used to represent the low frequency index array. In some embodiments, each element of the low frequency index array $\mathcal{L}$ can include a low frequency feature index $\mathcal{L}(x_i, y_j)$ indicating a low frequency feature at a corresponding position around $(x_i, y_j)$ of the image shared by the plurality of color channels. An exemplary process for calculating the low frequency index array is described below.

In the exemplary process, each element of the initial low frequency array $X^*$, i.e., each low frequency vector, can be weighted by a first weight matrix $W_1$, such that a weighted low frequency vector can be obtained corresponding to each element of the initial low frequency array $X^*$. Further, an argument minima of a first squared norm function of the weighted low frequency vector can be obtained. The low frequency feature index for each element of the low frequency index array can be determined based on the argument minima.

For example, a low frequency feature index $\mathcal{L}(x_i, y_j)$ of the low frequency index array $\mathcal{L}$ can be calculated by using the following equation:

$$\mathcal{L}(x_i, y_j) = \arg\min_u \Sigma_p \|W_1 X^*(p) - \mathcal{U}(p)d\|_2^2 \quad (1)$$

$\|b\|$ denotes a norm operation to a vector b. d is a unit vector. For example, if the image has three color channels (e.g., RGB channels), $d=[1, 1, 1]^T$. As another example, if the image has four color channels (e.g., CMYK channels), d=[1, 1, 1, 1]$^T$. p is a two-dimensional coordinate variable and can be assigned as a coordinate pair around $(x_i, y_j)$, and $\Sigma_p$. denotes a summation over applicable coordinate pairs p.

The first weight matrix $W_1$ can be a diagonal matrix. In some embodiments, for an image having three color channels (e.g., RGB channels), the first weight matrix can be a 3×3 matrix, i.e., $W_1 \in \mathfrak{R}^{3\times3}$, and the diagonal elements of the first weight matrix $W_1$ can be preset to have values of, e.g., 0.2126, 0.7152, and 0.0722, respectively. The first weight matrix $W_1$ having these values can be used for, e.g., converting a standard color image to a grayscale image. As another example, for an image having three color channels (e.g., RGB channels), the diagonal elements of the first weight matrix $W_1$ can be preset to have values of ⅓, ⅓, and ⅓, respectively.

At 340, a high frequency index array is calculated based on the initial high frequency array. In some embodiments, each element of the high frequency index array can include a high frequency feature index indicating a high frequency feature at a corresponding position around $(x_i, y_j)$ of the image shared by the plurality of color channels. An exemplary process for calculating the low frequency index array is described below.

In the exemplary process, each element of the initial high frequency array ($\mathcal{J}-X^*$), i.e., each high frequency vector, can be weighted by a second weight matrix $W_2$, such that a weighted high frequency vector can be obtained corresponding to each element of the initial high frequency matrix ($\mathcal{J}-X^*$). Further, an argument minima of a second squared norm function can be calculated based on the weighted high frequency vector. The high frequency feature index for each element of the high frequency index array can be determined based on the argument minima.

For example, a high frequency feature index $\mathcal{R}(x_i, y_j)$ of the high frequency index array $\mathcal{R}$ can be calculated by using the equation of:

$$\mathcal{R}(x_i,y_j) = \arg\min \Sigma_p \|W_2(\mathcal{J}(p)-X^*(p))-V(p)d\|_2^2 \quad (2).$$

$\|b\|$ denotes a norm operation to the vector b. d is the unit vector. p is a two-dimensional coordinate variable and can be assigned as a coordinate pair $(x_i, y_j)$, and $\Sigma_p$. denotes a summation over applicable coordinate pairs p.

The second weight matrix $W_2$ can be a diagonal matrix. In some embodiments, for an image having three color channels (e.g., RGB channels), the second weight matrix can be a 3×3 matrix, i.e., $W_2 \in \mathfrak{R}^{3\times3}$, and the diagonal elements of the second weight matrix $W_2$ can be preset to have values of, e.g., 0.2126, 0.7152, and 0.0722, respectively. The second weight matrix $W_2$ having these values can be used for, e.g., converting a standard color image to a grayscale image. In some other embodiments, for an image having three color channels (e.g., RGB channels), the diagonal elements of the second weight matrix $W_2$ can be preset as the values of ⅓, ⅓, and ⅓ respectively.

At 350, the low frequency information array is calculated based on the low frequency index array. In some embodiments, each low frequency feature vector in the low frequency information array can be calculated based on a corresponding low frequency feature index of the low frequency index array and a unit vector. For example, each low frequency feature vector in the low frequency information array can include a product of the corresponding low frequency feature index of the low frequency index array and the unit vector: $\mathcal{L}(x_i, y_j)d$. d is the unit vector, such as a three-dimensional unit vector in the situation where the image has three color channels (e.g., RGB channels).

At 360, the high frequency information array is calculated based on the high frequency index array. In some embodiments, each high frequency feature vector in the high frequency information array can be calculated based on a corresponding high frequency feature index of the high frequency index array and a unit vector. For example, each high frequency feature vector in the high frequency information array can include a product of the corresponding high frequency feature index of the high frequency index array and a unit vector: $\mathcal{R}(x_i, y_j)d$. d is the unit vector, such as a three-dimensional unit vector in the situation where the image has three color channels (e.g., RGB channels).

At 370, the color intensity information array is calculated based on the dynamic range array, the low frequency information array, and the high frequency information array. In some embodiments, for a pixel $(x_i, y_j)$ of the image, the corresponding element $\mathcal{L}(x_i, y_j)d$ of the low frequency information array and the corresponding element $\mathcal{R}(x_i, y_j)d$ of the high frequency information array can be subtracted from the corresponding element $\mathcal{J}(x_i, y_j)$ of the dynamic range array $\mathcal{J}$, and the remaining portion can contain the color intensity information of the pixel of the image. For example, each element of the color intensity information array $\mathcal{C}$ can be calculated by using the equation $\mathcal{C}(x_i, y_j) = \mathcal{J}(x_i, y_j) - \mathcal{L}(x_i, y_j)d - \mathcal{R}(x_i, y_j)d$. d is the unit vector.

As described above, the dynamic range representation can be decomposed into three portions. The smooth portion can be the low frequency information array including the low frequency information of the image. The detail portion can be the high frequency information array including the high frequency information of the image. The color portion can be the color intensity information array including the color intensity information of the image.

The process for decomposing the dynamic range representation into the smooth portion, the color portion, and the detail portion shown in FIG. 3 is only an example. Any other suitable decomposing process can be performed to separate the high frequency information, the color information, and the low frequency information of the image.

Referring again to FIG. 1, at 130, the smooth portion, the color portion, and the detail portion are respective adjusted to obtain an adjusted smooth portion, an adjusted color portion, and an adjusted detail portion.

Figure 4:
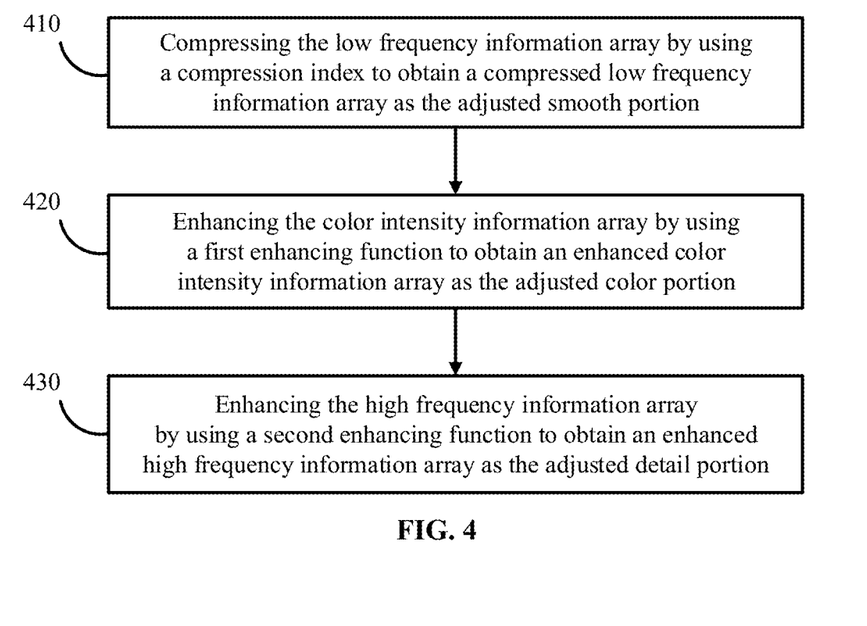
FIG. 4 illustrates a flow diagram of an exemplary process for adjusting a smooth portion, a color portion, and a detail portion in accordance with some embodiments of the disclosure.

In some embodiments, in order to compress the dynamic range of the image, the smooth portion can be compressed, while the color portion and the detail portion can be enhanced. FIG. 4 illustrates a flow diagram of an exemplary process for adjusting the smooth portion, the color portion, and the detail portion in the situation where the dynamic range representation includes the dynamic range array and the smooth portion, the color portion, and the detail portion include the low frequency information array, the color intensity information array, and the high frequency information array, respectively.

As shown in FIG. 4, at 410, the low frequency information array is compressed by using a compression index to obtain a compressed low frequency information array as the adjusted smooth portion. For example, each element $\mathcal{L}(x_i, y_j)d$ of the low frequency information array can be multiplied by a compression index α that is larger than zero and smaller than or equal to one. d is the unit vector and can have a dimension that is the same as the number of the color channels. In some embodiments, the compression index α may have a value of about 0.5.

At 420, the color intensity information array can be enhanced by using a first enhancing function to obtain an enhanced color intensity information array as the adjusted color portion. The first enhancing function can include a first arctangent function. For example, each element of the color intensity information array C can be enhanced by substituting the corresponding element of $\mathcal{C}$ into the function of $$f_1(k) = \frac{2}{\pi}\arctan(\beta_1 k).$$

$\beta_1$ is a first enhancement index that can be larger than one. In some embodiments, the first enhancement index $\beta_1$ may have a value of about 7.

At 430, the high frequency information array can be enhanced by using a second enhancing function to obtain an enhanced high frequency information array as the adjusted detail portion. The second enhancing function may be identical to or different from the first enhancing function.

For example, each element $(x_i, y_j)$d of the high frequency information array can be enhanced by substituting the corresponding element $(x_i, y_j)$d into the function of $$f_2(k) = \frac{2}{\pi}\arctan(\beta_2 k).$$

$\beta_2$ is a second enhancement index that can be larger than one. d is the unit vector and can have a dimension that is the same as the number of the color channels. In some embodiments, the second enhancement index $\beta_2$ may have a value of about 7.

The process for adjusting the smooth portion, the color portion, and the detail portion shown in FIG. 4 is only an example. Any other suitable adjusting process can be performed to obtain the adjusted smooth portion, the adjusted color portion, and the adjusted detail portion. Also, any suitable adjustment method can be applied to any one of the smooth portion, the color portion, and the detail portion based on various requirements of the output image. Further, any one or two of the smooth portion, the color portion, and the detail portion may be kept unchanged.

Figure 5:
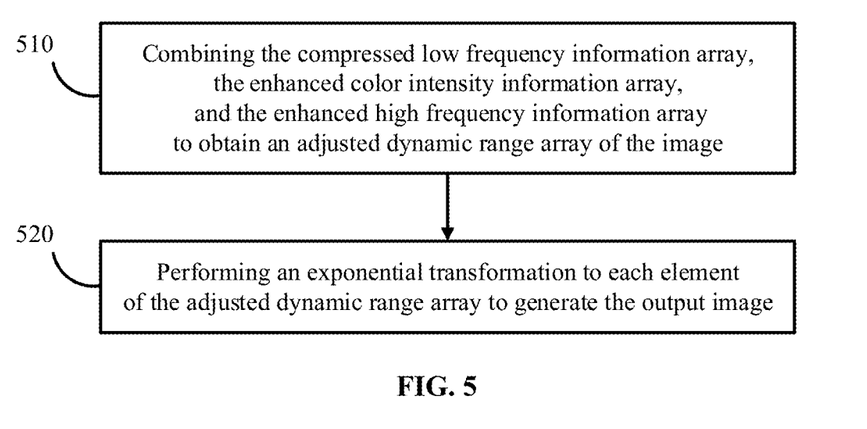
FIG. 5 illustrates a flow diagram of an exemplary process for generating an output image in accordance with some embodiments of the disclosure.

Referring again to FIG. 1, at 140, the adjusted smooth portion, the adjusted color portion, and the adjusted detail portion can be combined to generate an output image. FIG. 5 illustrates a flow diagram of an exemplary process for combining the adjusted smooth portion, the adjusted color portion, and the adjusted detail portion.

As shown in FIG. 5, at 510, the adjusted smooth portion, the adjusted color portion, and the adjusted detail portion are combined to generate an adjusted dynamic range array of the image.

In some embodiments, when the low frequency information array is compressed, while the color intensity information array and the high frequency information array are enhanced as described above in connection with FIG. 4, the compressed low frequency information array, the enhanced color intensity information array, and the enhanced high frequency information array can be added together to obtain the compressed dynamic range array $\mathcal{J}$ of the image. That is, for a pixel $(x_i, y_j)$, the corresponding element $\mathcal{L}'(x_i, y_j)$d of the compressed low frequency information array, the corresponding element $\mathcal{C}'(x_i, y_j)$ of the enhanced color intensity information array, and the corresponding element $\mathcal{R}'(x_i, y_j)$d the enhanced high frequency information array can be added, so that $\mathcal{J}'(x_i, y_j) = \mathcal{L}'(x_i, y_j)$d$+ \mathcal{C}'(x_i, y_j) + \mathcal{R}'(x_i, y_j)$d. d is the unit vector and can have a dimension that is the same as the number of the color channels.

At 520, an exponential transformation is performed on each element of the adjusted dynamic range array to generate the output image.

In some embodiments, an exponential transformation can be performed on each element $\mathcal{J}'(x_i, y_j) = \mathcal{L}'(x_i, y_j)$d$+ \mathcal{C}'(x_i, y_j) + \mathcal{R}'(x_i, y_j)$d of the compressed dynamic range array $\mathcal{J}'$ of the image to change the additive model to a multiplication model:'$(x_i, y_j)$=L'$(x_i, y_j)$d$\odot$C'$(x_i, y_j)$$\odot$R'$(x_i, y_j)$d. Where $\odot$ indicates a Hadamard product operation. d is the unit vector and can have a dimension that is the same as the number of the color channels.

The process for combining the adjusted smooth portion, the adjusted color portion, and the adjusted detail portion shown in FIG. 5 is only an example. Any other suitable combining process can be performed to obtain the output image for displaying.

Figure 6:
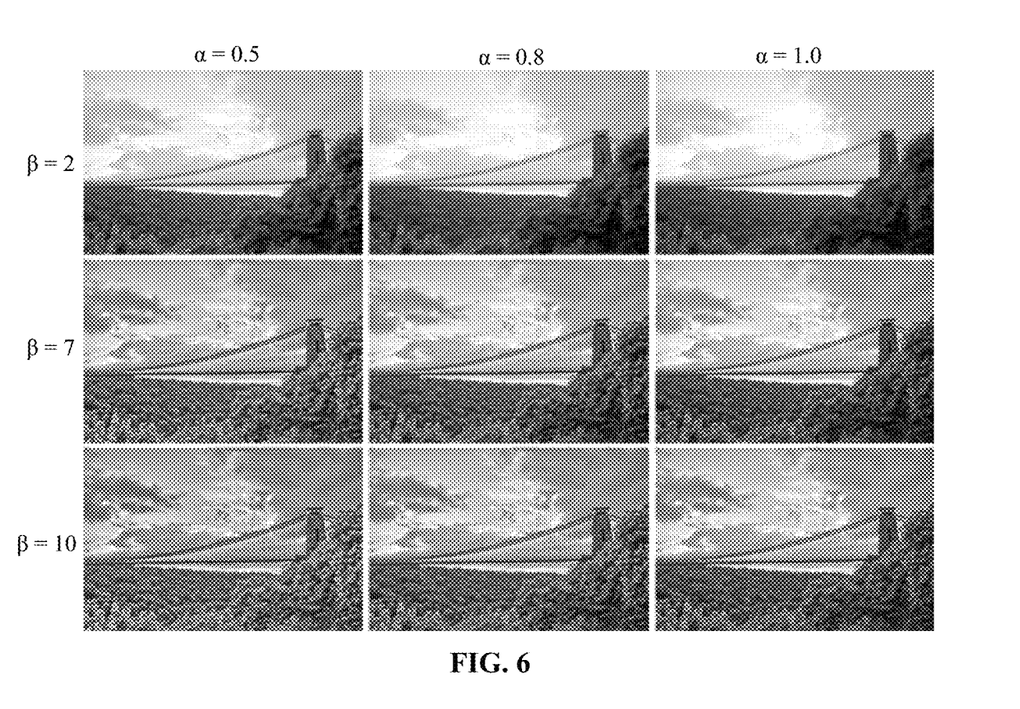
FIG. 6 illustrates a schematic diagram of exemplary displayed images based on various parameters in accordance with some embodiments of the disclosure.

FIG. 6 illustrates a schematic diagram of exemplary displayed images based on various parameters in accordance with some embodiments of the disclosure. In the examples shown in FIG. 6, the first enhancement index $\beta_1$ and the second enhancement index $\beta_2$ are set to be equal to each other, and collectively referred to as an enhancement index $\beta$. Further, different values of the compression index $\alpha$ and the enhancement index $\beta$ are applied to a same image, resulting different output images that can have different displaying effects in terms of, e.g., dynamic range, white balance, and/or color saturation, as shown in FIG. 6.

In FIG. 6, along the direction from left to right, the value of the compression index $\alpha$ increases. It can be seen that, an output image having a smaller compression index $\alpha$ can include more details. That is, more heavily compressed low frequency information may provide more visible details.

Along the direction from top to bottom in FIG. 6, the value of the enhancement index $\beta$. It can be seen that, an output image having a larger enhancing index $\beta$ can include more details and richer colors. That is, more heavily enhanced color information and high frequency information may provide more vivid colors and more visible details.

In some embodiments, Tone Mapped Image Quality Index (TMQI) can be used for evaluating the conversion of a high dynamic range (HDR) image to a low dynamic range (LDR) image. The TMQI values of the output images shown in FIG. 6 are illustrated in Table 1 below. The highest value 0.9074 indicates that, the image having a compression index $\alpha$=0.8 and an enhancing index $\beta$=10 has the best dynamic range compression result among the nine images shown in FIG. 6.

TABLE 1

| | | |
|---|---|---|
| 0.7928 | 0.7549 | 0.6827 |
| 0.8476 | 0.8727 | 0.8765 |
| 0.8890 | 0.9074 | 0.8921 |

It is noted that the above processes of the flow diagrams of FIGS. 1-5 can be executed or performed in any order or sequence not limited to the order and sequence shown in the figures and described above. Also, some of the above processes of the flow diagrams of FIGS. 1-5 can be executed or performed substantially simultaneously where appropriate or in parallel to reduce latency and processing time. Furthermore, FIGS. 1-5 are provided as examples only. At least some of the processes shown in the figures may be performed in a different order than represented, performed concurrently, or altogether omitted.

Figure 7:
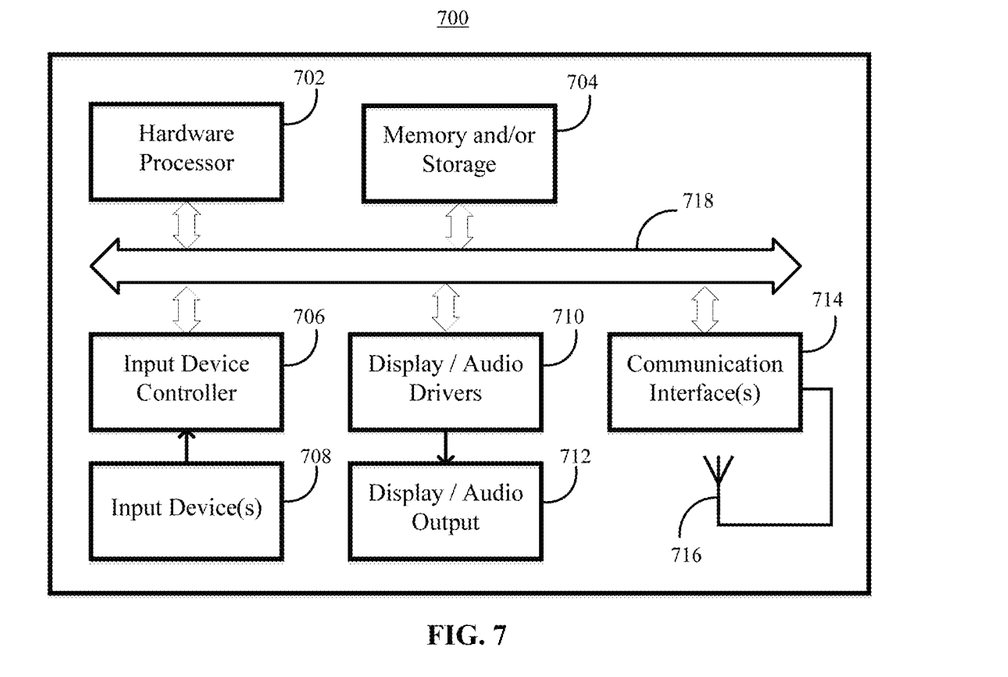
FIG. 7 illustrates a schematic structural diagram of an exemplary system for adjusting image dynamic range in accordance with some embodiments of the disclosure.

FIG. 7 illustrates a schematic structural diagram of an exemplary system 700 for adjusting image dynamic range in accordance with some embodiments of the disclosure.

The system 700 can be included in any suitable device that can performed an image processing function, and/or perform any other suitable functions, such as communicating with one or more devices or severs though a communication network, receiving user request, processing and transmitting data, etc. For example, the system 700 can be implemented in a mobile phone, a tablet computer, a laptop computer, a desktop computer, a set-top box, a television, a streaming media player, a game console, a server, and/or another suitable device.

The hardware of the system 700 can include a hardware processor 702, memory and/or storage 704, an input device controller 706, an input device 708, display/audio drivers 710, display and audio output circuitry 712, communication interface(s) 714, an antenna 716, and a bus 718.

Hardware processor 702 can include any suitable hardware processor, such as a microprocessor, a micro-controller, a central processing unit (CPU), a network processor (NP), a digital signal processor (DSP), an application specific integrated circuit (ASIC), a field-programmable gate array (FPGA), or other programmable logic device, discrete gate or transistor logic device, discrete hardware components. The hardware processor 702 can implement or execute various embodiments of the disclosure including one or more methods, steps, and logic diagrams. A general purpose processor may be a microprocessor or another conventional processor. For example, the hardware processor 702 can implement or execute various embodiments of the disclosed method for adjusting image dynamic range described above in connection with FIGS. 1-5.

Memory and/or storage 704 can be any suitable memory and/or storage for storing program codes, data, media content, image data, webpage URLs, channel page tables, raw data of webpage resources, information of users, and/or any other suitable content in some embodiments. For example, memory and/or storage 704 can include a random access memory (RAM), a read only memory, a flash memory, a non-volatile memory, such as a hard disk storage, an optical media, and/or any other suitable storage device.

Input device controller 706 can be any suitable circuitry for controlling and receiving input from one or more input devices 708 in some embodiments. For example, input device controller 706 can be circuitry for receiving an input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 710 can be any suitable circuitry for controlling and driving output to one or more display and audio output circuitries 712 in some embodiments. For example, display/audio drivers 710 can be circuitry for driving an LCD display, a speaker, an LED, and/or any other display/audio device. In some embodiments, display/audio drivers 710 can control a display to display an output image having an image dynamic range adjusted according to the disclosed method, such as one of the output images described above in connection with FIG. 6.

Communication interface(s) 714 can be any suitable circuitry for interfacing with one or more communication networks. For example, the interface(s) 714 can include a network interface card circuitry, a wireless communication circuitry, and/or any other suitable circuitry for interfacing with one or more communication networks, such as the Internet, a wide area network, a local network, a metropolitan area networks, etc.

Antenna 716 can be any suitable one or more antennas for wirelessly communicating with a communication network in some embodiments. In some embodiments, antenna 716 can be omitted when not needed.

In some embodiments, the communication network can be any suitable combination of one or more wired and/or wireless networks such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a WiFi network, a WiMax network, a satellite network, a mobile phone network, a mobile data network, a cable network, a telephone network, a fiber optic network, and/or any other suitable communication network, or any combination of any of such networks.

Bus 718 can be any suitable mechanism for communicating between two or more components of the system 700. Bus 718 may be any other suitable bus. The bus 718 can be divided into an address bus, a data bus, a control bus, etc. The bus 718 is represented as a two-way arrow in FIG. 8, but it does not mean that it is only one type bus or only one bus.

The processes in the disclosed method in various embodiments can be directly executed by a hardware decoding processor, or by a decoding processor including a hardware module and a software module. The software module may reside in any suitable storage/memory medium, such as a random access memory, a flash memory, a read-only memory, a programmable read-only memory, an electrically erasable programmable memory, a register, etc. The storage medium can be located in the memory and/or storage 704. The hardware processor 702 can implement the disclosed method by combining the hardware and the information read from the memory and/or storage 704.

In some embodiments, the system 700 may be implemented as an UAV (unmanned aerial vehicle). The UAV may include a gimbal, an imaging device (e.g., camera, etc.), a controller (e.g., processors, DSP, etc.). The imaging device may be configured to capture images (e.g., HRD images, etc.). The gimbal may be configured to stabilize the imaging device and compensate the vibration generated by the UAV. The controller may be configured to receive the images captured by the imaging device, and process the images.

In some embodiments, the controller may be configured to receive the HDR images captured by the imaging device, and process the HDR images in accordance with the method disclosed in the method described above. Thereafter, the controller may be configured to generate a LDR image based on the HDR image and the method disclosed above.

In some embodiments, the system 700 may be implemented as a remote controller (RC) to control the UAV as described above. The RC may be configured to receive the images captured by the imaging device of the UAV. For example, the RC may receive HDR images from the UAV, and process the HDR images in accordance with the method disclosed above. Further, the RC may be configured to generate LDR images based on the HDR images and the method disclosed above.

In addition, the flowcharts and block diagram in the figures illustrate various embodiments of the disclosed method and apparatus, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions.

It is noted that, in some embodiments, the functions illustrated in the blocks can be executed or performed in any order or sequence not limited to the order and sequence shown in the figures and described above. For example, two consecutive blocks may actually be executed substantially simultaneously where appropriate or in parallel to reduce latency and processing times, or even be executed in a reverse order depending on the functionality involved in.

It is also noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

Accordingly, methods, systems, and media for adjusting image dynamic range are provided.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Further, it is understood that the present disclosure has been made only by way of example, and that numerous changes in the details of embodiment of the disclosure can be made without departing from the spirit and scope of the disclosure. Features of the disclosed embodiments can be combined and rearranged in various ways. Without departing from the spirit and scope of the disclosure, modifications, equivalents, or improvements to the disclosure are understandable to those skilled in the art and are intended to be encompassed within the scope of the present disclosure. It should be noted that, similar reference numerals and letters are refer to similar items in the figures, and thus once an item is defined in one figure, there is no need to further define and/or explain the item in subsequent figures.

What is claimed is:

1. A method for adjusting image dynamic range, comprising:
    obtaining a dynamic range array of an image including a plurality of color channels, each element of the dynamic range array including a dynamic range vector for one of pixels of the image in the color channels;
    decomposing, by a hardware processor, the dynamic range array into a smooth portion, a color portion, and a detail portion, the smooth portion including a low frequency information array, the color portion including a color intensity information array, and the detail portion including a high frequency information array;
    adjusting the smooth portion, the color portion, and the detail portion, respectively, to obtain an adjusted smooth portion, an adjusted color portion, and an adjusted detail portion; and
    combining the adjusted smooth portion, the adjusted color portion, and the adjusted detail portion to generate an output image;
    wherein:
        each element of the low frequency information array includes a low frequency feature vector for one of the pixels,
        each element of the color intensity information array includes a color intensity feature vector for one of the pixels,
        each element of the high frequency information array includes a high frequency feature vector for one of the pixels, and
        the dynamic range vectors, the low frequency feature vectors, the color intensity feature vectors, and the high frequency feature vectors each have a dimension that is the same as a number of the color channels.

2. The method of claim 1, wherein:
    the plurality of color channels include a red color channel, a green color channel, and a blue color channel,
    the dynamic range vectors, the low frequency feature vectors, the color intensity feature vectors, and the high frequency feature vectors are three-dimensional vectors.

3. The method of claim 1, wherein obtaining the dynamic range array includes:
    obtaining an initial dynamic range array of the image based on digital information of the image;
    performing a logarithm transformation on each element of the initial dynamic range array to obtain a transformed dynamic range array; and
    normalizing the transformed dynamic range array to obtain the dynamic range array.

4. The method of claim 1, wherein decomposing the dynamic range array includes:
    performing at least one edge preserving filtering process on the dynamic range array to obtain an initial low frequency array, each element of the initial low frequency array including a low frequency vector for one of the pixels; and
    based on the dynamic range array and the initial low frequency array, calculating an initial high frequency array, each element of the initial high frequency array including a high frequency vector for one of the pixels;
    wherein the low frequency vectors and the high frequency vectors each have a dimension that is the same as the number of the color channels.

5. The method of claim 4, wherein performing the at least one edge preserving filtering process includes performing at least one globally-optimized edge preserving filtering method, including one of L0 smoothing method, edge preserving decomposition method, or total variation method.

6. The method of claim 4, wherein performing the at least one edge preserving filtering process includes performing at least one local-block-based edge preserving filtering method, including one of guided filtering method, local edge preserving decomposition method, or bilateral filtering method.

7. The method of claim 6, wherein the performing the at least one edge preserving filtering process includes performing the guided filtering method, including:
    performing a first guided filtering process at a first resolution; and
    performing a second guided filtering process at a second resolution that is different from the first resolution.

8. The method of claim 4, wherein decomposing the dynamic range array further includes:
    calculating a low frequency index array based on the initial low frequency array, wherein each element of the low frequency index array includes a low frequency feature index indicating a low frequency feature shared by the plurality of color channels; and calculating a high frequency index array based on the initial high frequency array, wherein each element of the high frequency index array includes a high frequency feature index indicating a high frequency feature of the pixel shared by the plurality of color channels.

9. The method of claim 8, wherein:
calculating the low frequency index array includes:
   weighting each element of the initial low frequency array by a first diagonal matrix to obtain a weighted low frequency vector, and
   determining an argument minima of a first squared norm function based on the weighted low frequency vector; and
calculating the high frequency index array includes:
   weighting each element of the initial high frequency array by a second diagonal matrix to obtain a weighted high frequency vector, and
   determining an argument minima of a second squared norm function based on the weighted high frequency vector.

10. The method of claim 8, wherein decomposing the dynamic range array further includes:
calculating the low frequency information array based on the low frequency index array, including calculating each low frequency feature vector based on the low frequency feature index of the corresponding pixel;
calculating the high frequency information array based on the high frequency index array, including calculating each high frequency feature vector based on the high frequency feature index of the corresponding pixel; and
calculating the color intensity information array based on the dynamic range array, the low frequency information array, and the high frequency information array.

11. A system for adjusting image dynamic range, the system comprising:
a hardware processor; and
a memory storing instructions that, when executed by the hardware processor, cause the hardware processor to:
   obtain a dynamic range array of an image including a plurality of color channels, each element of the dynamic range array including a dynamic range vector for one of pixels of the image in the color channels;
   decompose the dynamic range array into a smooth portion, a color portion, and a detail portion, the smooth portion including a low frequency information array, the color portion including a color intensity information array, and the detail portion including a high frequency information array;
   adjust the smooth portion, the color portion, and the detail portion, respectively, to obtain an adjusted smooth portion, an adjusted color portion, and an adjusted detail portion; and
   combine the adjusted smooth portion, the adjusted color portion, and the adjusted detail portion to generate an output image;
   wherein:
      each element of the low frequency information array includes a low frequency feature vector for one of the pixels,
      each element of the color intensity information array includes a color intensity feature vector for one of the pixels,
      each element of the high frequency information array includes a high frequency feature vector for one of the pixels, and
      the dynamic range vectors, the low frequency feature vectors, the color intensity feature vectors, and the high frequency feature vectors each have a dimension that is the same as a number of the color channels.

12. The system of claim 11, wherein:
the plurality of color channels include a red color channel, a green color channel, and a blue color channel,
the dynamic range vectors, the low frequency feature vectors, the color intensity feature vectors, and the high frequency feature vectors are three-dimensional vectors.

13. The system of claim 11, wherein the instructions further cause the hardware processor to:
obtain an initial dynamic range array of the image based on digital information of the image;
perform a logarithm transformation on each element of the initial dynamic range array to obtain a transformed dynamic range array; and
normalize the transformed dynamic range array to obtain the dynamic range array.

14. The system of claim 11, wherein the instructions further cause the hardware processor to:
perform at least one edge preserving filtering process on the dynamic range array to obtain an initial low frequency array, each element of the initial low frequency array including a low frequency vector for one of the pixels; and
based on the dynamic range array and the initial low frequency array, calculate an initial high frequency array, each element of the initial high frequency array including a high frequency vector for one of the pixels;
wherein the low frequency vectors and the high frequency vectors each have a dimension that is the same as the number of the color channels.

15. The system of claim 14, wherein the instructions further cause the hardware processor to perform at least one of:
a globally-optimized edge preserving filtering method, including one of L0 smoothing method, edge preserving decomposition method, or total variation method; or
a local-block-based edge preserving filtering method, including one of guided filtering method, local edge preserving decomposition method, or bilateral filtering method.

16. The system of claim 14, wherein the instructions further cause the hardware processor to:
calculate a low frequency index array based on the initial low frequency array, wherein each element of the low frequency index array includes a low frequency feature index indicating a low frequency feature shared by the plurality of color channels; and
calculate a high frequency index array based on the initial high frequency array, wherein each element of the high frequency index array includes a high frequency feature index indicating a high frequency feature of the pixel shared by the plurality of color channels.

17. The system of claim 11, wherein the instructions further cause the hardware processor to:
compress the low frequency information array by using a compression index to obtain a compressed low frequency information array as the adjusted smooth portion;

enhance the color intensity information array by using a first arc tangent function to obtain an enhanced color intensity information array as the adjusted color portion; and enhance the high frequency information array by using a second arc tangent function to obtain an enhanced high frequency information array as the adjusted detail portion.

18. The system of claim 17, wherein the instructions further cause the hardware processor to:

add the compressed low frequency information array, the enhanced color intensity information array, and the enhanced high frequency information array to obtain an adjusted dynamic range array of the image; and perform an exponential transformation to each element of the adjusted dynamic range array to generate the output image.

* * * * *